July 29, 1969    J. T. LINGLE    3,458,833

FREQUENCY CONTROL NETWORK FOR A CURRENT FEEDBACK OSCILLATOR

Filed Nov. 20, 1967

INVENTOR.
JOHN T. LINGLE

BY *Albt. Medwed*

ATTORNEY

United States Patent Office 3,458,833
Patented July 29, 1969

3,458,833
FREQUENCY CONTROL NETWORK FOR A CURRENT FEEDBACK OSCILLATOR
John T. Lingle, Bloomington, Minn., assignor, by mesne assignments, to the United States of America as represented by the Administrator of the National Aeronautics and Space Administration
Filed Nov. 20, 1967, Ser. No. 684,209
Int. Cl. H03k *3/28;* H02m *5/40, 3/22*
U.S. Cl. 331—113     4 Claims

ABSTRACT OF THE DISCLOSURE

A transistor multivibrator used in converting D-C voltages to A-C voltages or higher D-C voltages, with a negative feedback path including a switching network which fires or switches at a predetermined potential and applies negative and positive feedback to the multivibrator to change its state.

Background of the invention

The invention pertains to transistor multivibrators or oscillators used in converting from a D-C voltage to an A-C voltage or a higher D-C voltage. More particularly, the invention pertains to solid-state active element oscillators wherein a pair of transistors connected in push-pull relationship form the active elements.

Summary

A first and second transistor, a feedback transformer and an output transformer comprise a current feedback oscillator. The oscillator is recycled by application of negative feedback from a winding on the output transformer through a switching network to a winding on the feedback transformer where it overrides positive feedback inherent in the feedback transformer and causes the oscillator to recycle or switch. An inductor and a capacitor in the feedback circuit provide a sawtooth ramp signal which is impressed across a switching element in the network which fires rapidly when the breakover voltage is reached. The impedance of the switching element changes rapidly from a very high to a very low value and accomplishes very rapid switching of the oscillator.

Description of the preferred embodiment

Figure 1:
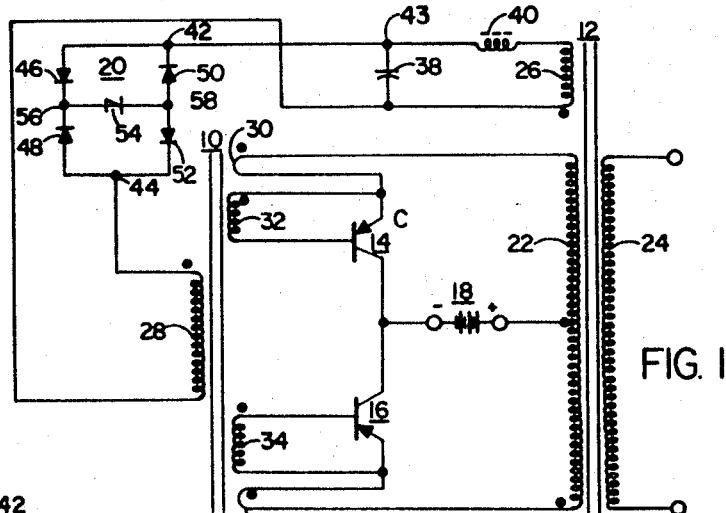
FIGURE 1 is a schematic diagram of a current feedback oscillator which is useful in low input voltage converters and includes a recycling circuit.

The current feedback oscillator of FIGURE 1 comprises a feedback transformer 10, an output transformer 12, transistors 14 and 16, D-C voltage source 18, and a feedback switching network 20. Transistors 14 and 16 are of the PNP type, each having base, collector, and emitter electrodes. The collectors are both connected to the negative terminal of source 18. Transformer 12 has a center tapped primary winding 22, an output secondary winding 24, and a feedback secondary winding 26. The center tap of winding 22 is connected to the positive terminal of source 18. Transformer 10 has a primary winding 28 and secondary windings 30, 32, 34 and 36. Winding 30 is connected between the emitter of transistor 14 and one end of winding 22. Winding 36 is connected between the emitter of transistor 16 and the other end of winding 22. Windings 32 and 34 are connected across the emitter-base junctions of transistors 14 and 16, respectively.

Connected in series across winding 26 of transformer 12 is a capacitor 38 and an inductor 40. Switching network 20 and winding 28 of transformer 10 are connected in series across capacitor 38. Network 20 has terminals 42 and 44. Terminal 42 is connected to a junction point 43 common to capacitor 38 and inductor 40. Network 20 comprises five diodes, 46, 48, 50, 52 and 54, and has two interior junction points 56 and 58. Diodes 46 and 50 are connected from terminal 42 to junctions 56 and 58, respectively; diodes 48 and 52 are connected from terminal 44 to junctions 56 and 58, respectively; and diode 54, which is shown as a four-layer Shockley diode, is connected between junctions 56 and 58.

Network 20 conducts when the potential across it reaches a level determined by the breakdown voltage of Shockley diode 54. Assuming the potential of terminal 42 is positive with respect to that of terminal 44 and is of sufficient magnitude to cause the breakdown of diode 54, current flows in the following path: terminal 42, diode 46, junction 56, diode 54, junction 58, diode 52, and terminal 44. Assuming the opposite condition prevails and the potential of terminal 42 is sufficiently negative with respect to that of terminal 44, current flows in the following path: terminal 44, diode 48, junction 56, diode 54, junction 58, diode 50 and terminal 42. Network 20 operates like a bridge rectifier circuit.

Operation

Assume that when the circuit is first turned on, transistor 14 begins conducting before transistor 16 does. Current flows in the series circuit comprising source 18, the upper half of winding 22, winding 30, and the emitter-collector junction of transistor 14. When transistor 14 starts to conduct, a voltage is developed across winding 30 which induces a voltage in winding 32. The voltage induced in winding 32 drives the emitter of transistor 14 positive with respect to its base and causes increased conduction in transistor 14. Thus the current increases rapidly until transistor 14 is driven into saturation. When this occurs, the voltage across the upper half of winding 22 can no longer increase and a condition of quasi-stable equilibrium is maintained. During this equilibrium, the voltage drop in transistor 14 is very small and the full source voltage appears across the upper half of primary winding 22.

When transistor 14 starts to conduct a voltage is also induced in winding 26 on transformer 12. Capacitor 38, in series with this winding, begins charging to the voltage across winding 26 through inductor 40. The waveform of the voltage across capacitor 38 is that of a ramp. Assume that capacitor 38 charges such that terminal 43 is negative relative to the other side of capacitor 38. Capacitor 38 charges to a voltage sufficient to break down Shockley diode 54 in switching network 20. When breakdown of diode 54 occurs, current flows from terminal 42 of network 20 through capacitor 38, through winding 28, to terminal 44 of network 20 through diode 48 to junction 56, through diode 54 to junction 58, and through diode 50 back to terminal 42. In effect, the voltage developed across capacitor 38 is suddenly applied to winding 28 of transformer 10 and a voltage is induced in winding 32 of transformer 10. The voltage induced in winding 32 provides negative feedback for transistor 14 causing its conduction to rapidly decrease. At the same time positive feedback is provided by the voltage induced in winding 34 and transistor 16 starts to conduct. In effect, transistor 14 is turned off and transistor 16 is turned on, and the cycle continues to repeat itself. The voltages in the various windings reverse polarity and capacitor 38 charges up in the reverse direction. When diode 54 again breaks down, current flows from terminal 42, through diode 46 to junction 56, through diode 54 to junction 58, through diode 52 to terminal 44, through winding 28 to capacitor 38 and through capacitor 38 to terminal 42.

The conduction state of transistor 14 causes the D-C voltage of source 18 to be applied across the upper half of the center tapped primary winding 22 of transformer 12 whereas the conduction of transistor 16 causes the same D-C voltage to be applied across the bottom half of the center tapped primary winding of transformer 12. The result of this switching action is a square wave voltage induced in secondary winding 24 of output transformer 12. The voltage developed across winding 24 can be rectified to provide a D-C voltage of greater magnitude than the D-C voltage of source 18, or it can be filtered to provide an A-C voltage.

Figure 2:
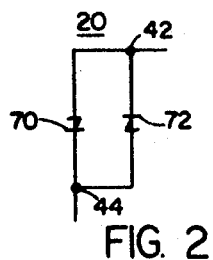
FIGURE 2 is a schematic diagram of a second negative feedback switching network for the oscillator of FIGURE 1.

FIGURE 2 illustrates a second network which can be used in place of network 20 of FIGURE 1. The network shown in FIGURE 2 comprises a pair of Shockley diodes 70 and 72 connected in parallel between terminals 42 and 44. Diode 70 will break down when terminal 42 is more positive than terminal 24 by a predetermined amount. Diode 72 will break down when terminal 44 is more positive than terminal 42 by a predetermined amount.

Figure 3:
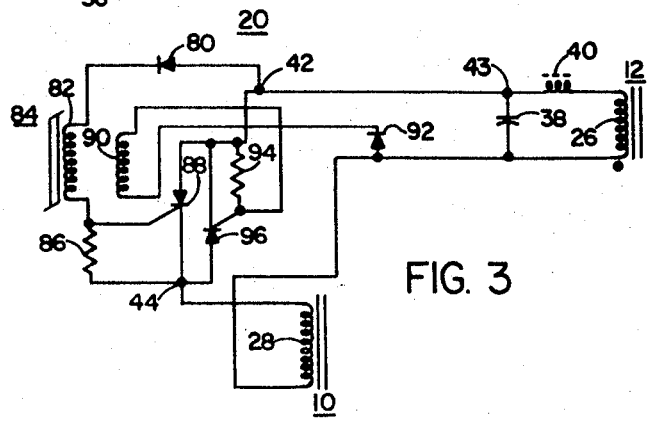
FIGURE 3 is a schematic diagram of a third negative feedback switching network for the oscillator of FIGURE 1.

FIGURE 3 illustrates a third switching network which can be used as a switching network for the oscillator of FIGURE 1. Assume in FIGURE 3 that capacitor 38 is charging to a voltage such that terminal 42 is positive with respect to terminal 44. Current will flow in a series circuit from terminal 42 through a forward diode 80, winding 82 of a saturable reactor 84, and a resistor 86 to terminal 44. Winding 82 of saturable reactor 84 initially presents a very high impedance to this current flow and consequently there is a very small voltage drop across resistor 86. Resistor 86 is connected between the gate and cathode electrodes of an SCR (silicon controlled rectifier) 88. The cathode of SCR 88 is also connected to terminal 44 and the anode is connected to terminal 42. As the voltage across capacitor 38 continues to increase, the current in winding 82 eventually reaches a point which causes saturation of reactor 84 and the impedance of winding 82 rapidly decreases causing a relatively large voltage to be applied across resistor 86. The large voltage suddenly appearing across resistor 86 turns on SCR (thyristor) 88 connected between terminals 42 and 44 and the voltage developed across capacitor 38 is applied to winding 28 of transformer 10.

Also associated with saturable reactor 84 is a second winding 90. During the second half of the oscillator cycle when capacitor 38 is charging in the opposite direction, current flows in a series path comprising a forward biased diode 92, winding 90, and a resistor 94 to terminal 42. When the voltage across capacitor 38 builds up sufficiently, winding 90 suddenly decreases in impedance and the entire voltage appears across resistor 94, turning on a second SCR 96. When turned on, SCR 96 provides a series path for current to flow from capacitor 38 through winding 28 of transformer 10.

Figure 4:
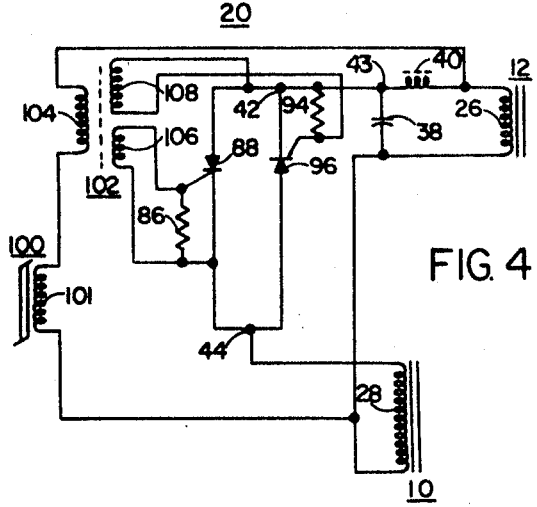
FIGURE 4 is a schematic diagram of a fourth negative feedback switching network for the oscillator FIGURE 1.

In FIGURE 4 a series circuit comprising a primary winding 104 of transformer 102 and winding 101 of saturable reactor 100 is connected across winding 26 of transformer 12. Until saturation of reactor 100 occurs, most of the voltage appears or is dropped across winding 101. When the voltage-time integral of saturable reactor 100 reaches a predetermined level, reactor 100 saturates and most of the voltage is dropped across primary winding 104 of transformer 102, inducing voltages in secondary windings 106 and 108. Windings 106 and 108 are connected across resistors 86 and 94, respectively. Depending upon the direction of current flow in primary winding 104, voltages are induced in windings 106 and 108 which provide the proper triggering potential for either SCR 88 or SCR 96. When SCR 88 is turned on, current can flow from terminal 42 to terminal 44 of network 20; when SCR 96 is turned on current can flow from terminal 44 to terminal 42 of network 20.

In all cases the impedance of the primary switching element of network 20 rapidly changes from a very high to a very low level to accomplish very rapid recycling of the oscillator.

Obviously many changes and modifications to the circuits as shown could be made by those skilled in the art without departing from the spirit and scope of the invention.

I claim:

1. In a current feedback oscillator comprising a pair of switching transistors, an output transformer connected to the transistors, and a feedback transformer, where the oscillator is recycled by the application of negative and positive feedback from a winding on the output transformer to a winding on the feedback transformer, the improvement comprising:

a first circuit comprising a capacitor and an inductance connected across the feedback winding of the output transformer, the capacitor developing a sawtooth voltage signal which is impressed across a second circuit comprising the feedback transformer winding and a switching network with a predetermined breakover voltage, the impedance of the network rapidly changing from a high to a low level when the sawtooth voltage is equal to the breakover voltage, causing the capacitor voltage to be impressed across the winding on the feedback transformer, effecting recycling of the oscillator.

2. The apparatus of claim 1 wherein the switching network comprises a diode bridge.

3. The apparatus of claim 1 wherein the switching network comprises a pair of parallel, oppositely poled diodes.

4. The apparatus of claim 1 wherein the switching network comprises:

first and second terminals;

first and second parallel, oppositely poled silicon controlled rectifiers connected between the terminals;

a first series circuit comprising a diode, resistor, and saturable reactor connected between the terminals, the resistor connected across the cathode and gate electrodes of the first silicon controlled rectifier;

a second series circuit comprising a diode, resistor and saturable reactor connected between the terminals, the resistor connected across the cathode and gate electrodes of the second silicon controlled rectifier, the first and second series circuits alternately conductive; and a voltage developed across the resistor in a conductive circuit when the voltage thereacross reaches a predetermined level and causes the saturable reactor in a conductive circuit to saturate, the voltage so developed triggering the associated silicon controlled rectifier which provides a low impedance path between the terminals.

References Cited

UNITED STATES PATENTS 3,206,694    9/1965    Bates.

ROY LAKE, Primary Examiner

S. H. GRIMM, Assistant Examiner

U.S. Cl. X.R.

321—2